United States Patent
McQuillen et al.

(10) Patent No.: US 10,190,541 B2
(45) Date of Patent: Jan. 29, 2019

(54) METHOD AND SYSTEM FOR ENGINE WATER INJECTION

(71) Applicant: Ford Global Technologies, LLC, Dearborn, MI (US)

(72) Inventors: Michael McQuillen, Warren, MI (US); Daniel A. Makled, Dearborn, MI (US); Mohannad Hakeem, Dearborn, MI (US); Gopichandra Surnilla, West Bloomfield, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 87 days.

(21) Appl. No.: 15/384,188

(22) Filed: Dec. 19, 2016

(65) Prior Publication Data
US 2018/0171935 A1    Jun. 21, 2018

(51) Int. Cl.
| | |
|---|---|
| *F02D 41/14* | (2006.01) |
| *F02D 19/12* | (2006.01) |
| *F02M 25/022* | (2006.01) |
| *F02M 25/028* | (2006.01) |
| *F02M 25/03* | (2006.01) |
| *F02D 41/00* | (2006.01) |

(52) U.S. Cl.
CPC ..... *F02M 25/0227* (2013.01); *F02D 41/0065* (2013.01); *F02D 41/1454* (2013.01); *F02M 25/028* (2013.01); *F02M 25/03* (2013.01)

(58) Field of Classification Search
CPC ............... F02D 41/0025; F02D 41/005; F02D 41/1454; F02D 41/0065; F02D 35/0015; F02D 2021/083; F02D 2041/1472; F02D 32/08; F02D 19/12; F02M 25/0227; F02M 25/028; F02M 25/03; F02M 25/0225; F02B 47/02
See application file for complete search history.

(56) References Cited

U.S. PATENT DOCUMENTS

| | | | |
|---|---|---|---|
| 6,026,641 A | 2/2000 | Liberty | |
| 6,112,705 A * | 9/2000 | Nakayama | F02B 47/02 123/25 C |

(Continued)

FOREIGN PATENT DOCUMENTS

EP    2607647 A1    6/2013

OTHER PUBLICATIONS

McQuillen, Michael, et al., "Method and System for Engine Water Injection," U.S. Appl. No. 15/384,150, filed Dec. 19, 2016, 48 pages.

(Continued)

*Primary Examiner* — Lindsay Low
*Assistant Examiner* — George Jin
(74) *Attorney, Agent, or Firm* — Julia Voutyras; McCoy Russell LLP

(57) ABSTRACT

Methods and systems are provided for adjusting water injection at distinct locations of an engine based on a total water injection error determined from an output of an exhaust oxygen sensor. The method may include injecting water at distinct locations based on a cooling demand and a dilution demand. Further, the method may include distributing the total injection error to respective water injectors, as well as adjusting engine operating parameters, to provide desired engine cooling and dilution.

20 Claims, 4 Drawing Sheets

(56) References Cited

U.S. PATENT DOCUMENTS

| | | |
|---|---|---|
| 8,127,745 B2 | 3/2012 | Surnilla et al. |
| 8,296,042 B2 | 10/2012 | Xiao et al. |
| 8,352,162 B2 | 1/2013 | Leone et al. |
| 8,434,431 B2 | 5/2013 | Fried et al. |
| 8,522,760 B2 | 9/2013 | Soltis |
| 8,763,594 B2 | 7/2014 | Surnilla et al. |
| 8,960,133 B2 | 2/2015 | Leone et al. |
| 9,038,580 B2 | 5/2015 | Surnilla et al. |
| 9,169,755 B2 | 10/2015 | Ulrey et al. |
| 9,291,125 B2 | 3/2016 | Yoshihara et al. |
| 9,410,466 B2 | 8/2016 | Surnilla et al. |
| 9,528,448 B2 | 12/2016 | Makled et al. |
| 2010/0121559 A1 | 5/2010 | Bromberg et al. |
| 2011/0174267 A1 | 7/2011 | Surnilla et al. |
| 2013/0206100 A1 | 8/2013 | Yacoub |
| 2013/0218438 A1* | 8/2013 | Surnilla ............. F02D 41/0025 701/102 |
| 2014/0366508 A1* | 12/2014 | Ulrey ................. F01N 3/04 60/274 |
| 2016/0131048 A1 | 5/2016 | Surnilla et al. |
| 2017/0159614 A1* | 6/2017 | Miller .................. F02D 41/144 |

OTHER PUBLICATIONS

McQuillen, Michael, et al., "Method and System for Pulsed Engine Water Injection," U.S. Appl. No. 15/384,172, filed Dec. 19, 2016, 49 pages.

McQuillen, Michael, et al., "Method and System for Adjusting Engine Water Injection," U.S. Appl. No. 15/384,204, filed Dec. 19, 2016, 75 pages.

McQuillen, Michael, et al., "Method and System for Adjusting Engine Water Injection," U.S. Appl. No. 15/384,223, filed Dec. 19, 2016, 77 pages.

Shelby, Michael Howard, et al., "Method and System for Engine Water Injection," U.S. Appl. No. 15/384,243, filed Dec. 19, 2016, 55 pages.

Hakeem, Mohannad, et al., "Method and System for Water Injection Control," U.S. Appl. No. 15/384,253, filed Dec. 19, 2016, 45 pages.

* cited by examiner

METHOD AND SYSTEM FOR ENGINE WATER INJECTION

FIELD

The present description relates generally to methods and systems for controlling water injection to provide an engine charge dilution.

BACKGROUND/SUMMARY

Internal combustion engines may include water injection systems that inject water into a plurality of locations, including an intake manifold, upstream of engine cylinders, or directly into engine cylinders. Injecting water into the engine intake air may increase fuel economy and engine performance, as well as decrease engine emissions. When water is injected into the engine intake or cylinders, heat is transferred from the intake air and/or engine components to the water. This heat transfer leads to evaporation, which results in cooling. Injecting water into the intake air (e.g., in the intake manifold) lowers both the intake air temperature and a temperature of combustion at the engine cylinders. By cooling the intake air charge, a knock tendency may be decreased without enriching the combustion air-fuel ratio. This may also allow for a higher compression ratio, advanced ignition timing, and decreased exhaust temperature. As a result, fuel efficiency is increased. Additionally, greater volumetric efficiency may lead to increased torque. Furthermore, lowered combustion temperature with water injection may reduce NOx, while a more efficient fuel mixture may reduce carbon monoxide and hydrocarbon emissions.

Water injection may be controlled based on feedback from an exhaust oxygen sensor. In particular, the injected water may generate a dilution effect, and the oxygen sensor may learn a change in the oxygen content of the exhaust gas due to the presence of the added dilution. For example, as shown by Leone et al. in U.S. Pat. No. 8,960,133, an amount of water injected for knock relief is controlled based on excess oxygen being detected by an exhaust oxygen sensor.

However the inventors herein have recognized potential issues with such an approach.

The approach of '133 relies on a single water injector being operated at a time. Consequently, the water injection error learned via the exhaust oxygen sensor is attributed to only that water injection, which is then duly corrected. In engine systems configured with multiple water injectors, at any given time, different amounts of water may be injected into distinct engine locations to address charge cooling, component cooling, and charge dilution (for example, concurrently). This may complicate assigning of water injection errors to distinct injections and performing of a water injection correction. The system may instead need to rely on multiple sensors positioned at distinct locations, adding cost and complexity. As another example, each water injector may have distinct injection limits due to the location of water injection as well as the prevalent engine operating conditions. For example, the output of a manifold water injector may be constrained by the manifold humidity, which in turn is a function of the manifold air temperature and pressure. The difference in injection limits may complicate the water injection error correction. Errors in water injection can result in engine knock, cylinder misfire events, as well as combustion instability.

In one example, some of the above issues may be addressed by a method for an engine comprising: injecting water into distinct engine locations responsive to each of an engine dilution demand and an engine cooling demand; and correcting a total water injection amount based on feedback from an exhaust oxygen sensor operating in a variable voltage mode. In this way, water injection errors may be better addressed.

As an example, water may be concurrently injected into multiple locations of an engine to meet each of an engine cooling demand (e.g., for knock relief) and an engine dilution demand. For example, water may be injected into an intake manifold via a manifold injector, and into an intake port via a port injector. A total amount of water that is commanded to be injected into the engine, as well as a ratio of the total amount of water commanded to each location, may be based on the engine cooling demand relative to the engine dilution demand. Further, the engine dilution demand may be met in coordination with the usage of exhaust gas recirculation (EGR). An exhaust oxygen sensor may be operated in a variable voltage mode before and after the water injection, and the excess oxygen in the exhaust measured by the sensor may be attributed to the total amount of water that was received in the engine. A water injection error may then be determined based on the total commanded amount and the total measured amount. An engine controller may then learn the injection limits for each water injector, including upper and lower thresholds, and error tolerances. Based on the initial water injection ratio, the magnitude and directionality of the water injection error, as well as the injection limits for each water injector, water injection commands to the distinct injectors may be updated. For example, if the error requires an additional amount of water to be added, and the error is not symmetrically divisible between the two injectors due to an injection limit of one injector being reached, the error may be asymmetrically divided. In one example, the error may be addressed by increasing the water injection amount of the manifold injector until a manifold water saturation point is reached, after which the error may be compensated by increasing water injection via the port injector.

In this way, water injection can be used as a surrogate for EGR as well as for knock relief, simultaneously, and an exhaust oxygen sensor can be used for feedback control of the liquid EGR and the knock relief. The technical effect of using feedback from the oxygen sensor to determine a total water injection error, and compensating for the error by distributing the error amount between distinct water injectors based on their individual injector limits, is that a water error may be better compensated for. By using water to meet an engine dilution demand and an engine cooling demand, knock and combustion instability issues may be addressed with reduced reliance on spark retard, improving fuel economy. By operating an exhaust oxygen sensor in a variable voltage mode, excess water in the engine from all the water injection locations may be dissociated and a total change in oxygen amount can be associated with the total water injection. By relying on an existing exhaust oxygen sensor for feedback control of water injection from multiple injectors, the need for dedicated sensors, including sensors for each distinct water injection, is reduced.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

The following description relates to systems and methods for accurately estimating water injection errors following water injection from a water injection system coupled to a vehicle engine, as described with reference to the vehicle system of FIG. 1. The engine system may be configured to inject water at various locations, such as into an intake manifold, an intake port, and directly into a cylinder, to provide diverse water injection benefits such as charge air cooling, engine component cooling, and engine dilution. A controller may be configured to perform a control routine, such as the example routines of FIGS. 2-3, to learn a water injection error based on the output of an exhaust oxygen sensor operating in a variable voltage mode. The controller may then compensate for the error by adjusting water injection amounts from distinct water injectors differently. An example water injection error learning and compensation is shown at FIG. 4. By enabling more water to be injected into the engine more accurately, water injection benefits may be extended over a wider range of engine operating conditions. As a result, water usage may be improved to enable significant fuel economy improvements to a vehicle's performance.

Figure 1:
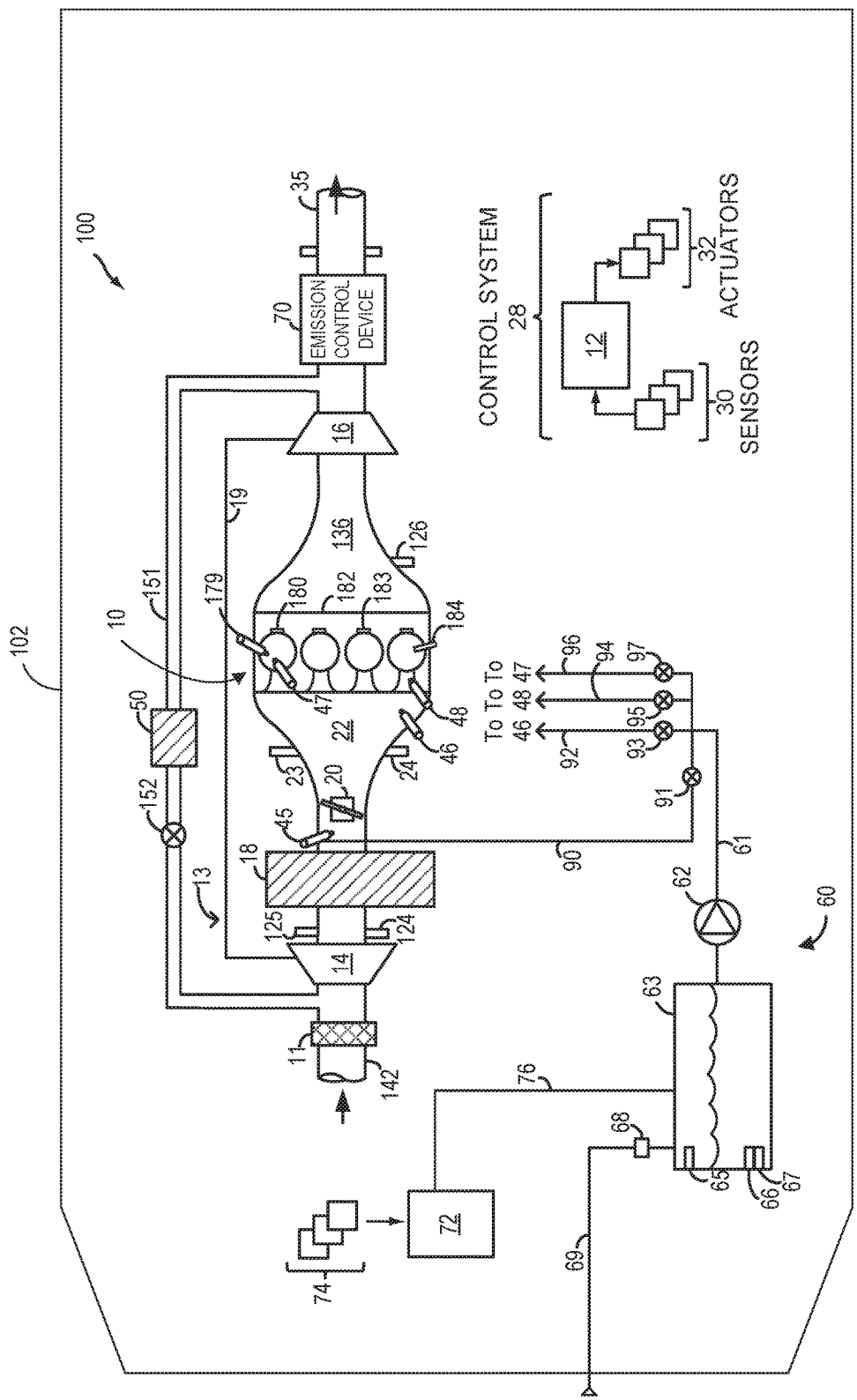
FIG. 1 shows a schematic diagram of an engine system configured for water injection.

Turning to the figures, FIG. 1 shows an embodiment of a water injection system 60 and an engine system 100, in a motor vehicle 102, illustrated schematically. In the depicted embodiment, engine 10 is a boosted engine coupled to a turbocharger 13 including a compressor 14 driven by a turbine 16. Specifically, fresh air is introduced along intake passage 142 into engine 10 via air cleaner 11 and flows to compressor 14. The compressor may be a suitable intake-air compressor, such as a motor-driven or driveshaft driven supercharger compressor. In the engine system 100, the compressor is shown as a turbocharger compressor mechanically coupled to turbine 16 via a shaft 19, the turbine 16 driven by expanding engine exhaust. In one embodiment, the compressor and turbine may be coupled within a twin scroll turbocharger. In another embodiment, the turbocharger may be a variable geometry turbocharger (VGT), where turbine geometry is actively varied as a function of engine speed and other operating conditions.

As shown in FIG. 1, compressor 14 is coupled, through charge air cooler (CAC) 18 to throttle valve (e.g., intake throttle) 20. The CAC may be an air-to-air or air-to-coolant heat exchanger, for example. Throttle valve 20 is coupled to engine intake manifold 22. From the compressor 14, the hot compressed air charge enters the inlet of the CAC 18, cools as it travels through the CAC, and then exits to pass through the throttle valve 20 to the intake manifold 22. In the embodiment shown in FIG. 1, the pressure of the air charge within the intake manifold is sensed by manifold air pressure (MAP) sensor 24 and a boost pressure is sensed by boost pressure sensor 124. A compressor by-pass valve (not shown) may be coupled in series between the inlet and the outlet of compressor 14. The compressor by-pass valve may be a normally closed valve configured to open under selected operating conditions to relieve excess boost pressure. For example, the compressor by-pass valve may be opened during conditions of decreasing engine speed to avert compressor surge.

Intake manifold 22 is coupled to a series of combustion chambers or cylinders 180 through a series of intake valves (not shown). As shown in FIG. 1, the intake manifold 22 is arranged upstream of all combustion chambers 180 of engine 10. Sensors such as manifold charge temperature (MCT) sensor 23 and air charge temperature sensor (ACT) 125 may be included to determine the temperature of intake air at the respective locations in the intake passage. In some examples, the MCT and the ACT sensors may be thermistors and the output of the thermistors may be used to determine the intake air temperature in the passage 142. The MCT sensor 23 may be positioned between the throttle 20 and the intake valves of the combustion chambers 180. The ACT sensor 125 may be located upstream of the CAC 18 as shown, however, in alternate embodiments, the ACT sensor 125 may be positioned upstream of compressor 14. The air temperature may be further used in conjunction with an engine coolant temperature to compute the amount of fuel that is delivered to the engine, for example.

The combustion chambers are further coupled to exhaust manifold 136 via a series of exhaust valves (not shown). In the depicted embodiment, a single exhaust manifold 136 is shown. However, in other embodiments, the exhaust manifold may include a plurality of exhaust manifold sections. Configurations having a plurality of exhaust manifold sections may enable effluent from different combustion chambers to be directed to different locations in the engine system. Universal Exhaust Gas Oxygen (UEGO) sensor 126 is shown coupled to exhaust manifold 136 upstream of turbine 16. Alternatively, a two-state exhaust gas oxygen sensor may be substituted for UEGO sensor 126.

As shown in FIG. 1, exhaust from the one or more exhaust manifold sections is directed to turbine 16 to drive the turbine. When reduced turbine torque is desired, some exhaust may be directed instead through a waste gate (not shown), by-passing the turbine. The combined flow from the turbine and the waste gate then flows through emission control device 70. In general, one or more emission control devices 70 may include one or more exhaust after-treatment catalysts configured to catalytically treat the exhaust flow, and thereby reduce an amount of one or more substances in the exhaust flow. In one example, emission control device 70 may include a three-way catalyst (TWC).

All or part of the treated exhaust from emission control device 70 may be released into the atmosphere via exhaust conduit 35. Depending on operating conditions, however, some exhaust may be diverted instead to an exhaust gas recirculation (EGR) passage 151, through EGR cooler 50 and EGR valve 152, to the inlet of compressor 14. In this manner, the compressor is configured to admit exhaust tapped (e.g. taken) from downstream of turbine 16.

The EGR valve 152 may be opened to admit a controlled amount of cooled exhaust gas to the compressor inlet for desirable combustion and emissions-control performance. In this way, engine system 100 is adapted to provide external, low-pressure (LP) EGR. In other embodiments, the EGR system may be a high pressure EGR system with EGR passage 151 connecting from upstream of the turbine 16 to downstream of the compressor 14. In some embodiments, the MCT sensor 23 may be positioned to determine the manifold charge temperature, and may include air and exhaust recirculated through the EGR passage 151.

The combustion chambers are further coupled to exhaust manifold 136 via a series of exhaust valves (not shown). The combustion chambers 180 are capped by cylinder head 182 and coupled to fuel injectors 179 (while only one fuel injector is shown in FIG. 1, each combustion chamber includes a fuel injector coupled thereto). Fuel may be delivered to fuel injector 179 by a fuel system (not shown) including a fuel tank, a fuel pump, and a fuel rail. Furthermore, combustion chamber 180 draws in water and/or water vapor, which may be injected into the engine intake or the combustion chambers 180 themselves by a plurality of water injectors 45-48. In the depicted embodiment, the water injection system is configured to inject water upstream of the throttle 20 via water injector 45, downstream of the throttle and into the intake manifold 22 via injector 46, into one or more intake runners (e.g., ports) 185 via injector 48, and directly into one or more combustion chambers 180 via injector 47. In one embodiment, injector 48 arranged in the intake runners may be angled toward and facing the intake valve of the cylinder which the intake runner is attached to. As a result, injector 48 may inject water directly onto the intake valve (this may result in fast evaporation of the injected water and increase the dilution benefit of using the water vapor as EGR to reduce pumping losses). In another embodiment, injector 48 may be angled away from the intake valve and be arranged to inject water against the intake air flow direction through the intake runner. As a result, more of the injected water may be entrained into the air stream, thereby increasing the cooling benefit. Though only one representative injector 47 and injector 48 are shown in FIG. 1, each combustion chamber 180 and intake runner 185 may include its own injector. In alternate embodiments, a water injection system may include water injectors positioned at one or more of these positions. For example, an engine may include only water injector 46, in one embodiment. In another embodiment, an engine may include each of water injector 46, water injectors 48 (one at each intake runner), and water injectors 47 (one at each combustion chamber). Water may be delivered to water injectors 45-48 by the water injection system 60, as described further below.

The water injection system 60 includes a water storage tank (or reservoir) 63, a water pump 62, and a water filling passage (e.g., manual water filling passage) 69. Additionally, water injection system 60 is coupled to water collection system 172, which extracts water (e.g., in the form of liquid condensate) from an air conditioning system, as described further below. Water stored in water storage tank 63 is delivered to water injector 33 via water passage 61. In another embodiment, water stored in water storage tank 63 may be delivered to multiple water injectors coupled to the intake, as previously described. In embodiments that include multiple injectors, water passage 61 may include one or more valves and water passages (not shown) to select between different water injectors or one or more water pumps each coupled to a water injector passage for one or more injectors. Water pump 62 may be operated by a controller 12 to provide water to water injector 33 via passage 61.

It will be appreciated that each of the intake oxygen sensor 34 and UEGO sensor 126 may be operated in various modes based on the engine operating conditions and further based on the nature of the estimation being performed by the sensor. For example, during engine fueling conditions when dilution/EGR estimation is required, the intake oxygen sensor may be operated in a nominal mode with a (fixed) reference voltage applied to the sensor, the reference voltage maintained during the sensing. During engine fueling conditions when exhaust air-fuel ratio estimation is required, the exhaust oxygen sensor may be operated in a nominal mode with a (fixed) reference voltage applied to the sensor, the reference voltage maintained during the sensing. In one example, the reference voltage may be 450 mV. During other conditions, such as during engine non-fueling conditions (e.g., during a DFSO), when ambient humidity (in the intake aircharge) estimation is required, the intake oxygen sensor may be operated in a variable voltage mode with the reference voltage applied to the sensor modulated. In still another example, the sensor may be operated in the variable voltage mode when EGR or dilution estimation is performed while fuel vapor purge (from a fuel system canister) or positive crankcase ventilation (of the engine crankcase) is enabled. Likewise, during conditions when exhaust dilution estimation is required following a water injection, the UEGO sensor may be operated in the variable voltage mode. Therein, the reference voltage of the oxygen sensor is modulated between the nominal reference voltage of 450 mV and a higher reference voltage of 800 mV (or 950 mV). By changing the intake oxygen sensor's reference voltage, or Nernst voltage, the sensor goes from reacting hydrocarbons with ambient oxygen at the sensor to dissociating the products of the reaction (water and carbon dioxide). By operating the UEGO sensor in VVs mode, the controller may determine a total amount of water injected from multiple injector locations. Based on the difference between the amount commanded and the total determined amount, the controller may determine a water injection error. As described further below with respect to the method shown in FIG. 2, this error may then be distributed between different water injectors based on individual water injection limits of the water injectors to increase water injection accuracy.

Water storage tank 63 may include a water level sensor 65, a water quality sensor 66, and a water temperature sensor 67, which may relay information to controller 12. For example, in freezing conditions, water temperature sensor 67 detects whether the water in tank 63 is frozen or available for injection. In some embodiments, an engine coolant passage (not shown) may be thermally coupled with storage tank 63 to thaw frozen water. The water quality sensor 66 may detect whether the water in water storage tank 63 is suitable for injection. As one example, water quality sensor 66 may be a conductivity sensor. The level of water stored in water tank 63, as identified by water level sensor 65, may be communicated to the vehicle operator and/or used to adjust engine operation. For example, a water gauge or indication on a vehicle instrument panel (not shown) may be used to communicate the level of water. In another example, the level of water in water tank 63 may be used to determine whether sufficient water for injection is available, as described below with reference to FIG. 2. In the depicted embodiment, water storage tank 63 may be manually refilled via water filling passage 69 and/or refilled automatically by the collection system 72 via water tank filling passage 76. Collection system 72 may be coupled to one or more components 74 that refill the water storage tank with condensate collected from various engine or vehicle systems. In one example, collection system 72 may be coupled with an EGR system to collect water condensed from exhaust passing through the EGR system. In another example, collection system 72 may be coupled with an air conditioning system. Manual filling passage 69 may be fluidically coupled to a filter 68, which may remove small impurities contained in the water that could potentially damage engine components.

FIG. 1 further shows a control system 28. Control system 28 may be communicatively coupled to various components of engine system 100 to carry out the control routines and actions described herein. For example, as shown in FIG. 1, control system 28 may include an electronic digital controller 12. Controller 12 may be a microcomputer, including a microprocessor unit, input/output ports, an electronic storage medium for executable programs and calibration values, random access memory, keep alive memory, and a data bus. As depicted, controller 12 may receive input from a plurality of sensors 30, which may include user inputs and/or sensors (such as for sensing transmission gear position, accelerator pedal input (e.g., pedal position), brake pedal input, transmission selector position, vehicle speed, engine speed, mass airflow through the engine, boost pressure, ambient temperature, ambient humidity, intake air temperature, fan speed, etc.), cooling system sensors (such as an ECT sensor, and sensors for sensing fan speed, passenger compartment temperature, ambient humidity, etc.), CAC 18 sensors (such as CAC inlet air temperature sensor, ACT sensor 125, CAC outlet air temperature sensor, MCT sensor 23, etc.), knock sensors 183 for determining ignition of end gases and/or water distribution among cylinders, water injection system sensors (such as water level sensor 65, water quality sensor 66, and water temperature sensor 67), exhaust pressure and temperature sensors 80, 82, and others. Furthermore, controller 12 may communicate with various actuators 32, which may include engine actuators (such as fuel injectors, an electronically controlled intake air throttle plate, spark plugs 184, the various water injectors, wastegate, EGR valve, etc.). In some examples, the storage medium (e.g., memory) may be programmed with computer readable data representing instructions executable by the processor for performing the methods described below as well as other variants that are anticipated but not specifically listed.

The controller 12 receives signals from the various sensors of FIG. 1 and employs the various actuators of FIG. 1 to adjust engine operation based on the received signals and instructions stored on a memory of the controller. For example, injecting water to the engine may include adjusting an actuator of injectors 45-48 to inject water and adjusting water injection may include adjusting an amount or timing of water injected via adjustments to a duty cycle of the injector. In another example, adjusting water injection parameters for water injection system 60 may include receiving output from a UEGO sensor 126 and adjusting an actuator of water injectors 45-48 to adjust an amount of water injected at the engine, as described further below with reference to FIG. 2.

In this way, the system of FIG. 1 enables a system injecting water into distinct engine locations responsive to each of an engine dilution demand and an engine cooling demand; and correcting a total water injection amount based on feedback from an exhaust oxygen sensor operating in a variable voltage mode.

Figure 2:
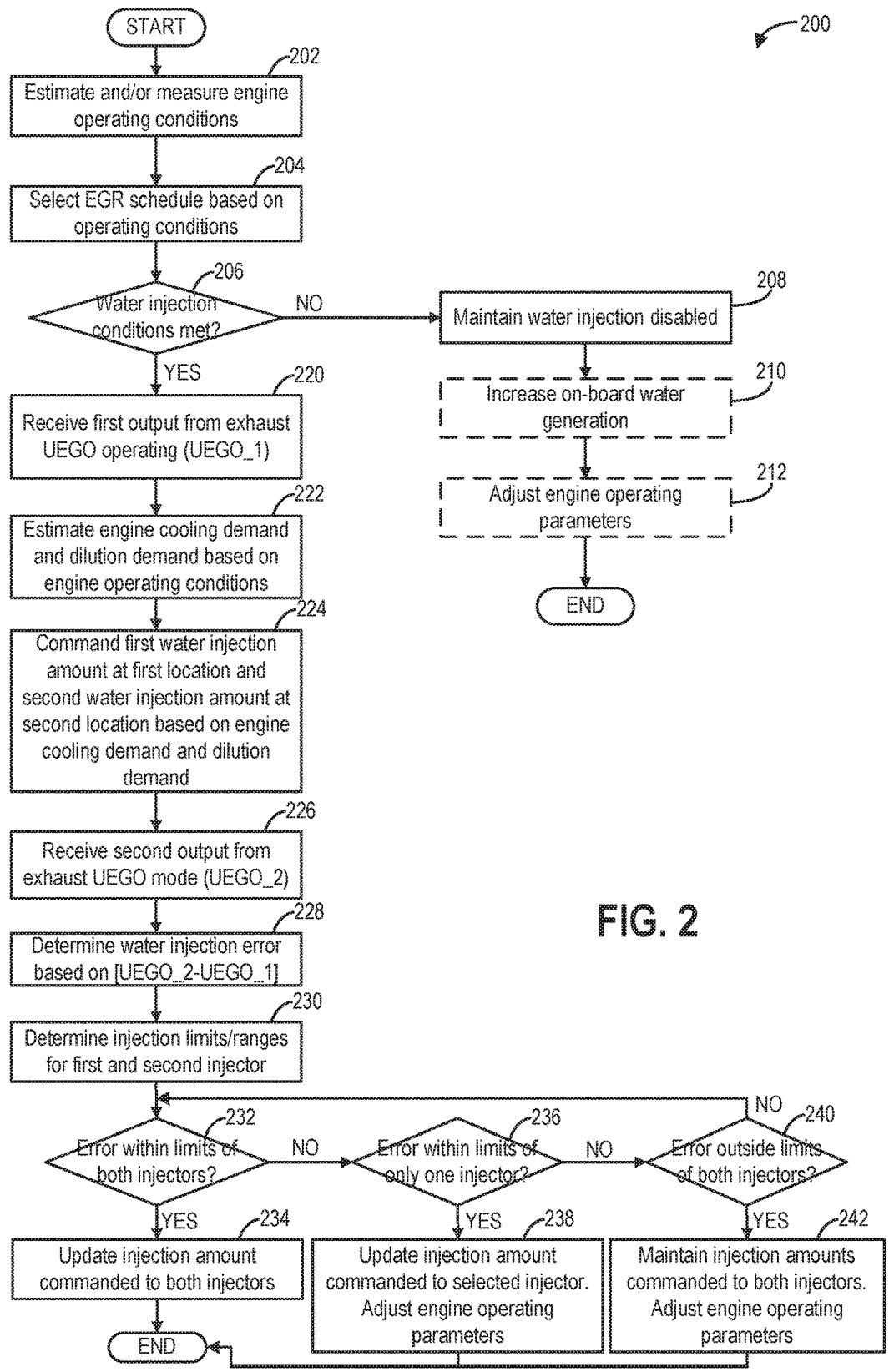
FIG. 2 shows a high level flow chart for providing closed-loop water injection control based on output from an exhaust oxygen sensor operating in a variable voltage mode.

In FIG. 2, an example method 200 for learning water injection errors and adjusting water injection from one or more water injectors to compensate for the error is shown. Injecting water may include injecting water via one or more water injectors of a water injection system, such as the water injection system 60 shown in FIG. 1. Instructions for carrying out method 200 and the rest of the methods included herein may be executed by a controller (such as controller 12 shown in FIG. 1) based on instructions stored on a memory of the controller and in conjunction with signals received from sensors of the engine system, such as the sensors described above with reference to FIG. 1. The controller may employ engine actuators of the engine system to adjust engine operation, according to the methods described below. For example, the controller may send a pulse-width signal to an actuator for a particular water injector to inject an amount water corresponding to that pulse-width at the given location of the engine. The method enables water amounts injected into an engine at one or more locations in response to a dilution demand and a cooling demand to be corrected based on feedback from an exhaust oxygen sensor.

The method 200 begins at 202 by estimating and/or measuring engine operating conditions. Engine operating conditions may include driver torque demand, manifold pressure (MAP), air-fuel ratio (A/F), spark timing, ambient conditions including ambient temperature, pressure, and humidity, boost pressure, an exhaust gas recirculation (EGR) rate, mass air flow (MAF), manifold charge temperature (MCT), engine speed and/or load, an engine knock level, etc. At 204, the method includes selecting an EGR schedule based on operating conditions. For example, the controller may select a fixed or variable EGR schedule. In one example, the controller may determine the EGR schedule (including an EGR rate, percentage, amount, temperature, etc.) based on engine speed and load conditions. In another example, the EGR schedule may be determined based on a speed-load table stored in the memory of controller 12. EGR may be provided at a fixed EGR schedule during engine operating conditions in the fixed schedule range, wherein the EGR percentage of intake air flow remains constant over the fixed speed and load range. In one example, the fixed EGR schedule range may include all engine loads from mid load down to minimum engine load, and/or engine speeds lower than a threshold, such as 3500 RPMs. EGR may be provided at the variable EGR schedule during engine operating conditions in the variable schedule range, wherein the EGR percentage of intake air flow is varied based on engine speed and load changes. The variable EGR schedule operating region may include engine speed and load conditions outside the fixed schedule range, and in some examples may include all engine loads above mid-load (e.g., above 50% engine load) and all engine speeds above a threshold, such as 3500 RPMs. Further, the EGR schedule may be based on water injection parameters. For example, the controller may select the fixed EGR schedule based on engine speed and load conditions during water injection conditions. As a result, the EGR percentage of intake air flow remains constant over the fixed speed and load range, as previously described, and water injection is adjusted, as described further below, to provide a desired total dilution. In this way, water injection may be used as liquid EGR and coordinated with the EGR schedule to meet a dilution demand of the engine.

Next, at 206, the method includes determining whether water injection conditions have been met. Water injection may be requested to leverage one or more benefits associated with water injection. For example, water injection may be requested at low-mid engine loads to increase charge dilution, thereby improving combustion stability in the low-mid load engine operating region. As another example, water injection may be requested at mid-high engine loads to increase charge cooling, thereby improving knock relief in the mid-high load engine operating region. Further still, water injection may be requested at high loads to provide component cooling, such as to cool the exhaust gas, cool an exhaust catalyst, etc. Water injection conditions may be considered met responsive to engine load being higher than a threshold load (below which engine combustion stability may be affected) and spark timing being retarded (e.g., from MBT) by more than a threshold amount.

In one example, water injection may be requested in response to a manifold temperature being greater than a threshold level. Additionally, water injection may be requested when a threshold engine speed or load is reached. In yet another example, water injection may be requested based on an engine knock level being above a threshold. Further, water injection may be requested in response to an exhaust gas temperature being above a threshold temperature, where the threshold temperature is a temperature above which degradation of engine components downstream of cylinders may occur. In addition, water may be injected when the inferred octane number of used fuel is below a threshold.

Confirming whether water injection conditions have been met may further include confirming that water is available for injection by estimating and/or measuring water availability. Water availability for injection may be determined based on the output of a plurality of sensors, such as a water level sensor, a water quality sensor, and/or a water temperature sensor disposed in the water storage tank of the water injection system of the engine (such as water level sensor 65, water quality sensor 66, and water temperature sensor 67 shown in FIG. 1). For example, water in the water storage tank may be unavailable for injection in freezing conditions (e.g., when the water temperature in the tank is below a threshold level, where the threshold level is at or near a freezing temperature). In another example, the level of water in the water storage tank may be below a threshold level, where the threshold level is based on an amount of water required for an injection event or a period of injection cycles. In response to the water level of the water storage tank being below the threshold level, refilling of the tank may be indicated.

If water injection conditions are not met, at 208, the method includes disabling water injection. In one example, where water injection conditions are not met due to water injection not being requested, the method includes continuing engine operation without water injection. In another example, where water injection conditions are not met due to water not being available for injection, such as when the water level of the water storage tank is below a threshold level, the controller may increase on-board water generation at 210. For example, the method at 210 may include refilling the water tank by increasing on-board collection of water from one or more vehicle systems, such as by collecting water from a water collection system coupled to a water storage tank of a water injection system of the engine (such as water collection system 72 shown in FIG. 1). This includes increasing air conditioning (AC) condenser operation to increase AC condensate collection, increasing EGR condensate collection, increasing CAC condensate collection, etc. In addition, at 210, the controller may indicate that (manual) refilling of the tank is required. Additionally, if water injection conditions are not met and water injection is disabled, the method may further include adjusting engine operating parameters at 212. In one example, if water injection has been requested to reduce knock, engine operation adjustments may include enriching the air-fuel ratio, reducing an amount of throttle opening to decrease manifold pressure, retarding spark timing, etc. As another example, if water injection was requested to increase charge dilution, engine operation adjustments may include increasing EGR flow. In this way, engine operating parameters are adjusted to compensate for the lack of water injection.

However, if water injection conditions are met at 206, the method continues at 220 and includes receiving a first output (UEGO_1) from an exhaust UEGO. The controller may receive output from the exhaust UEGO (such as UEGO 126 shown in FIG. 1) operating in a nominal mode or a variable voltage mode (VVs) based on engine fueling conditions, as described further below with regard to FIG. 3. The output of the UEGO may include a pumping current (Ip) output by the sensor following application of a voltage. In one example, when the engine is operating fueled, the UEGO sensor may be operated in a variable voltage mode with the reference voltage applied to the sensor being modulated. In an alternate example, when the engine is operating unfueled, the UEGO sensor may be operated in a nominal mode with a single, nominal reference voltage applied to the sensor.

At 222, the method includes estimating engine cooling demand and dilution demand based on engine operating conditions. The cooling demand of the engine may be determined based on an indication of knock (e.g., detecting knock or anticipating knock). The controller may determine if knock is occurring based on output from one or more engine knock sensors (such as knock sensors 183 shown in FIG. 1) exceeding a knock threshold. In an alternate example, knock may be anticipated when the engine speed and load is greater than a threshold. Further still, the likelihood of knock in one or more cylinders may be based on the knock history (e.g., knock count) of the engine. When the engine is knock limited, water injection may be requested in order to provide charge cooling. Further, water may be injected to increase intake charge dilution and reduce pumping losses. In one example, increased dilution may be requested in response to an engine speed/load being below a threshold, where the threshold engine speed/load may be indicative of a speed-load region where pumping losses are more likely to occur. In another example, charge dilution may be demanded when the engine is at or near a combustion stability limit.

Next, at 224, the method includes commanding a first water injection amount at a first location and a second water injection amount at a second location based on the engine cooling demand and dilution demand. As an example, the controller may inject water at a location from water injectors that inject water into the manifold and into ports away from intake valves in response to a cooling demand. Further, injecting water in response to a dilution demand may include injecting water during intake valve opening. As another example, the controller may inject water from water injectors that port inject water onto the intake valve and/or manifold surface in response to a dilution demand. Further, injecting water in response to a dilution demand may include injecting water onto a closed intake valve. The controller may initially determine a total amount of water to inject into the engine to meet the cooling demand and the dilution demand. Then, the controller may determine a proportioning of the total amount into the first water injection amount at the first location and the second water injection amount at the second location (and a third amount at a third location and so on as required) based on the charge cooling demand relative to the dilution demand and further based on engine conditions at the time of the injection. For example, the controller may send a signal to an actuator of each water injector to vary the pulse-width of the injectors corresponding to the first and second locations, thereby commanding the determined first and second amounts of water.

The controller may determine the first and second water injection amounts and the first and second locations based on the dilution demand relative to the cooling demand, as determined at 222 of the method. In one example, the controller may inject more water via a manifold water injector (such as water injector 45 shown in FIG. 1) relative to an amount of water injected via an intake port water injector oriented away an intake valve in response to a dilution demand being higher than a cooling demand. In another example, the controller may command that more water be injected via port water injectors relative to the manifold water injector in response to a cooling demand that is greater relative to a dilution demand. Additionally, the proportioning may be based on the location of the injectors, the total commanded amount in relation to the duty cycle of the individual injectors, injector constraints, as well as manifold humidity limits. In this way, water may be injected at the engine to provide both cooling and dilution.

After commanding the water injection, at 226, the method includes receiving a second output (UEGO_2) from the exhaust UEGO sensor operating in the nominal or variable voltage mode. Then, at 228, the method includes determining a water injection error based on a difference between the outputs as:

Water injection error=$f[(UEGO\_2)-(UEGO\_1)]$.

The controller may compare the first output of the UEGO sensor from before the water injection to the second sensor output after the water injection to determine the actual amount of water that was received in the engine (that is, the actual amount that contributed to the charge cooling and/or dilution effect). As discussed earlier, the actual water injection amount may vary from the commanded water injection amount due to injector errors, due to water spray impingement errors, vaporization issues due to conditions in the vicinity of the injector, etc. This can result in a water injection error that, if not accounted for, can reduce the intended benefits of the water injection and even degrade engine performance.

The controller may refer a look-up table that uses the difference between the first and second output of the UEGO sensor as an input and provides the water injection error as an output. The total water injection error is a sum of water injection errors from each injector. By determining the total water injection error, the error may be distributed to each injector to compensate for the determined error. In this way, the output of the UEGO sensor may be used to determine the total water injection error in the engine based on a total amount of water commanded to be injected relative to the total water sensed in the engine, and then, as described further below, water injection from each of the first and second injector may be adjusted based on the total water injection error.

The method continues at 230 and includes determining injection limits/ranges for the first and second injector. As such, for each water injector, there may be an upper limit above which additional water cannot be delivered, and a lower limit corresponding to a minimum amount of water that has to be delivered via that injector. The upper and lower limits may thereby define an operating range of the injector and reflect a water injection amount range that can be delivered by that injector. For each injector, based on the location of water injection and local engine conditions, the upper and lower limits may change, thereby narrowing or broadening the range. The upper and lower limits may change at different rates and with different directionalities. As one example, based on engine operating conditions, both upper and lower limits may rise or fall (relative to a nominal setting). As another example, based on engine operating conditions, one of the upper and lower limit may rise while the other falls (relative to the nominal setting).

In one example, the water injection limit of the injector may include a pulse-width limit of the injector. In another example, the water injection limit of the injector may be reached when the flow rate of the injector reaches a limit. In yet another example, the water injection limit of the injector may be reached when the humidity in the vicinity of the injector reaches a saturation limit. As such, the limit of the first injector may be different than the limit of the second injector. In addition, the constraints and limits of each injector may vary differently as engine operating conditions change. For example, as ambient humidity increases, the upper injection limit of a first water injector (e.g., manifold injector) may decrease while the upper injection limit of a second water injector (e.g., direct injector) increases.

Next, the method at 232 includes determining whether the determined total water injection error is within the limits of both injectors. If the error is within the limits of both injectors, the method continues to 234 and includes updating an injection amount commanded to both injectors. Since the water injection error is within the determined limits of both injectors, the water injection error may be compensated for by adjusting water injection to both injectors. Adjusting water injection may include adjusting the amount of water and/or timing of water delivered by each of the selected water injector(s) for a subsequent water injection (e.g., an immediately subsequent water injection with no water injection in between, or a number of successive water injections following the water injection with the error) based on the determined error. For example, in response to the actual water injection amount received at the engine being less than the commanded amount for dilution and charge cooling, the controller may increase both the first water injection amount from the first injector and the second water injection amount from the second injector. In one example, the controller may increase the first water injection amount from the first injector and the second water injection amount from the second injector symmetrically wherein the pulse-width of the first water injector may be increased by an amount and the pulse-width of the second water injector may be increased by the same amount (or by the same degree). In an alternate example, the controller may increase the first water injection amount from the first injector and the second water injection amount from the second injector asymmetrically wherein the pulse-width of the first water injector may be increased by an amount based on the charge cooling/dilution effect of the first injection and the pulse-width of the second water injector may be increased by an amount based on the charge cooling/dilution effect of the second injection. In another example, the controller may increase water injection via the port water injector in response to the actual water injection amount being less than the commanded amount for a desired cooling benefit. In yet another example, if the actual water injection amount received at the engine for a dilution demand was less than the commanded amount, the controller may decrease manifold water injection to compensate for a condensed portion of the injected water.

However, if the error is not within the limits of both injectors, the method continues at 236 wherein it is determined whether the error is within the limits of only one injector.

If the error is within the limits of one injector (and outside the limit of the other injector), the method at 238 includes updating an injection amount commanded to the selected injector and not compensating for the error via adjustments to the other injector. Additionally, the method at 238 includes adjusting engine operating parameters. In one example, in response to the sensed water injection amount being less than the commanded water injection amount, the controller may increase the amount of water delivered for the water next injection via only the selected water injector (for example, by commanding a larger pulse-width) while maintaining the amount of water for the water injector that is at the limit. Further still, the controller may adjust engine operation to compensate for the determined error responsive to the error lying outside the limits of one of the injectors. For example, spark timing adjustments may be used to compensate for the determined error of the injected water when the water injection was used for cooling. As an example, a larger portion of water may be injected from port injectors relative to the manifold injector responsive to a dilution demand greater than a dilution demand. Then, based on the total injection error and manifold injection at the upper limit, the controller may increase the port water injection amount until the upper limit is reached and increase EGR flow to provide the total desired dilution. As another example, a larger portion of water may be injected from manifold injectors relative to port injectors responsive to a larger cooling demand. Following water injection, in response to the total injection error and manifold injection at the upper limit, the controller may maintain current water injection parameters and increase an amount of spark retard to provide the desired cooling benefit.

If the error is not within the limits of one injector, the method continues to 240 wherein it is determined whether the error is outside the limits of both injectors. If the error is not outside the limits of both injectors, the method returns to the method at 232. If the error is outside the limits of both injectors, at 242 the method includes maintaining the injection amounts commanded to both injectors. Additionally, at 242, the method includes compensating for the water injection error by adjusting one or more engine operating parameters, as discussed previously with regard to the method at 238. Since the water injection error is outside the limits of both injectors, the controller compensates for the total water injection error by adjusting engine operating parameters. Adjusting engine operating parameters based on the determined error may include adjusting one or more of spark timing, EGR flow (via adjustments to an EGR valve position), engine fueling, throttle position, combustion air-fuel ratio, etc. For example, EGR adjustments may be used to compensate for the determined error of the injected water when the water injection was used for dilution control. If water injection was requested in response to a dilution demand higher than a cooling demand, the controller may increase EGR flow (e.g., by increasing a degree of opening of the EGR valve) while maintaining the commanded water injection amounts for dilution responsive to a water injection deficit (less water was actually sensed than was commanded). In another example, spark timing adjustments may be used to compensate for the determined error of the injected water when the water injection was used for charge cooling or knock control. The controller may adjust spark timing to compensate for the determined error of the injected water when the water injection was used for knock control (and charge cooling) in response to the water injection error lying outside the limits of both injectors.

Therein, responsive to a water injection deficit (less water was actually sensed than was commanded), spark timing may be retarded (e.g., from MBT), an amount of spark retard increased as the water injection error increases. In yet another example, a fuel injection amount may be adjusted based on the determined water injection error.

In this way, water injection from one or more water injectors at distinct engine locations may be adjusted based on the determined water injection error and the limits of the injectors to provide a desired water injection benefit to the engine. Additionally, when one or both water injectors is at an upper or lower limit, such that water injection cannot be used to compensate for the water injection error, engine operating parameters may be adjusted to compensate for the water injection error.

Figure 3:
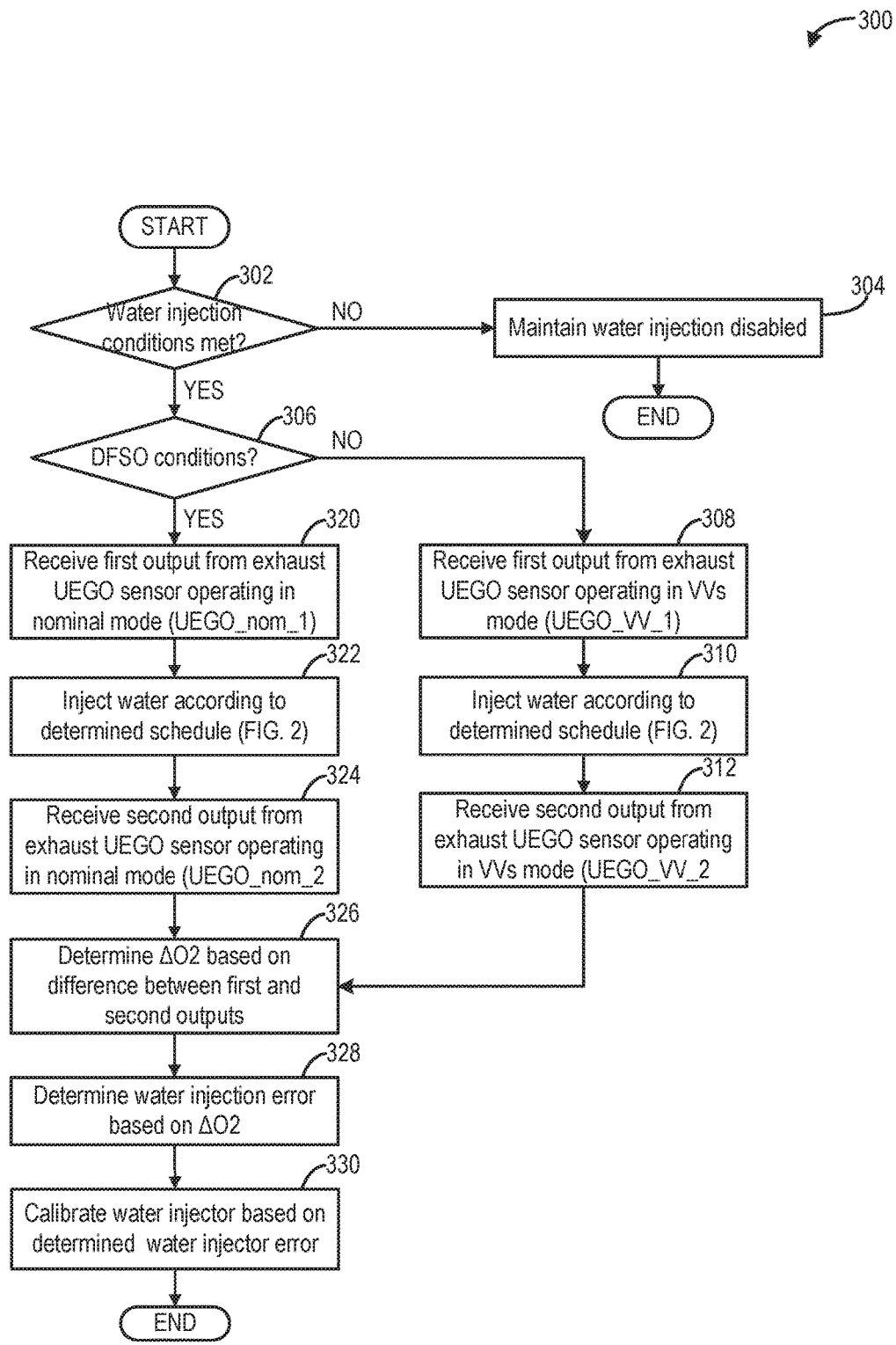
FIG. 3 shows a high level flow chart for learning a water injection error and adjusting water injection based on the error.
Figure 4:
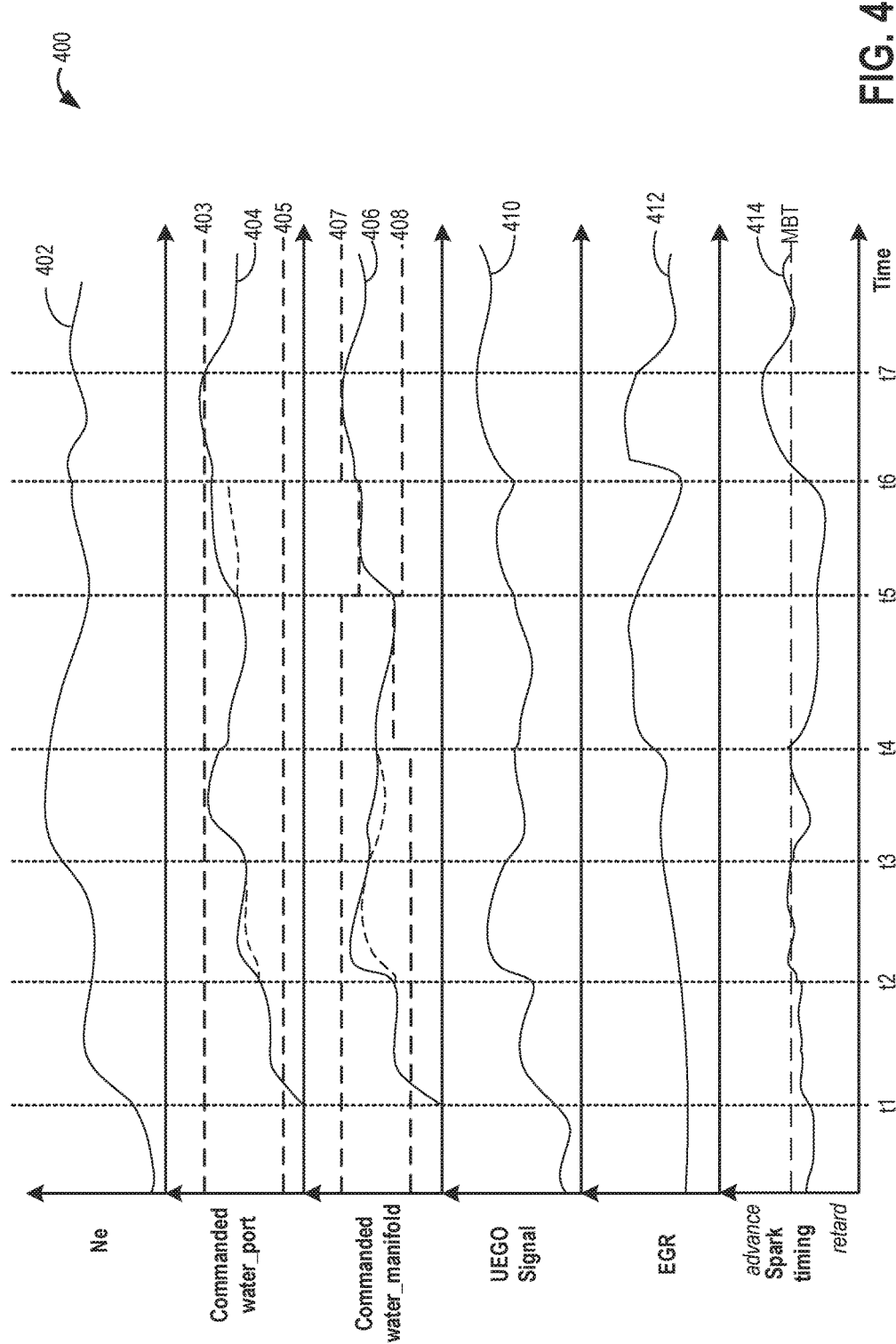
FIG. 4 shows a graph depicting example adjustments to water injection at distinct locations based on feedback from an exhaust oxygen sensor.

In FIG. 3, an example method 300 for learning a water injection error and for determining a water injection amount to deliver to compensate for the error is shown. As previously discussed with regard to the method 200 in FIG. 2, an exhaust UEGO sensor (such as UEGO 126 shown in FIG. 1) may be used to determine a total amount of water injected following water injection from a first water injector at a first location and a second water injection at a second location. The UEGO sensor may be operated in various modes based on the engine operating conditions and further based on the nature of the estimation being performed by the sensor. During engine fueling conditions, the exhaust UEGO may be operated in a nominal mode with a (fixed) reference voltage applied to the sensor. Conversely, during other conditions, such as during engine non-fueling conditions (e.g., during a DFSO), the UEGO sensor may be operated in the variable voltage mode. As such, the method 300 shows an example method for determining the water injection amount based engine operating parameters and for selecting an exhaust UEGO operating mode that enables water injection error detection.

The method 300 begins at 302 by determining whether water injection conditions have been met. As described above with regard to 206 of the method 200, water injection conditions may be considered met when water injection at an engine is requested and water is available for water injection. In one example, water injection may be requested in response to a manifold temperature being greater than a threshold level. Additionally, water injection may be requested when a threshold engine speed or load is reached. In yet another example, water injection may be requested based on an engine knock level being above a threshold. Further, water injection may be requested in response to an exhaust gas temperature above a threshold temperature, where the threshold temperature is a temperature above which degradation of engine components downstream of cylinders may occur. In addition, water may be injected when the inferred octane number of used fuel is below a threshold. Further, determining whether water injection conditions have been met at 302 of the method may include estimating and/or measuring water availability for injection. Water availability for injection may be determined based on the output of a plurality of sensors, such as a water level sensor and/or a water temperature sensor disposed in the water storage tank of the water injection system of the engine (such as water level sensor 65 and water temperature sensor 67 shown in FIG. 1). For example, water in the water storage tank may be unavailable for injection in freezing conditions (e.g., when the water temperature in the tank is below a threshold level, where the threshold level is at or near a freezing temperature). In another example, the level of water in the water storage tank may be below a threshold level, where the threshold level is based on an amount of water required for an injection event or a period of injection cycles. In response to the water level of the water storage tank being below the threshold level, refilling of the tank may be indicated.

If water injection conditions are not met at 302, the method continues at 304 to maintain water injection disabled. In one example, water injection is not requested and the method includes continuing engine operation. In another example, water injection is not available for injection. If water is not available for injection, the method at 304 may include accelerating the collecting of water from one or more vehicle systems, such as collecting water from a water collection system coupled to a water storage tank of a water injection system of the engine (such as water collection system 72 shown in FIG. 1). Additionally or alternatively, the controller may send a notification to a vehicle operator to manually refill the tank. The routine then ends and the engine is operated without water injection.

If water injection conditions are met at 302, the method continues to 306 wherein it is determined whether non-fueling (e.g., DFSO) conditions are occurring. Non-fueling conditions may include engine operating conditions in which fuel supply is interrupted but the engine continues spinning and at least one intake valve and one exhaust valve are operating; thus, air is flowing through one or more of the cylinders, but fuel is not injected in the cylinders. Under non-fueling conditions, combustion is not carried out and ambient air may move through the cylinder from the intake passage to the exhaust passage. Non-fueling conditions may include, for example, deceleration fuel shut off (DFSO) events. DFSO may be responsive to an accelerator pedal tip-out event, and may occur repeatedly during a drive cycle. As described above, fueling conditions of the engine may be used to determine the operating mode of the exhaust UEGO. For example, during engine fueling conditions when exhaust air-fuel ratio estimation is required, the exhaust UEGO sensor may be operated in a nominal mode with a (fixed) reference voltage applied to the sensor, the reference voltage maintained during the sensing. In one example, the reference voltage may be 450 mV. During other conditions, such as during engine non-fueling conditions (e.g., during a DFSO), the UEGO sensor may be operated in the variable voltage mode. Therein, the reference voltage of the oxygen sensor is modulated between the nominal reference voltage of 450 mV and a higher reference voltage of 800 mV (or 950 mV).

If the engine is not operating under DFSO conditions, the method at 308 includes receiving a first output from the exhaust UEGO operating in a variable voltage (VVs) mode (UEGO_VV_1). Specifically, at 315, the method includes estimating an exhaust oxygen level (or an inferred exhaust humidity) based on output from an exhaust oxygen sensor (or UEGO sensor, such as UEGO 126 shown in FIG. 1) operating in a variable voltage mode. In the variable voltage mode, the sensor is modulated between a lower reference voltage (such as 450 mV) and a higher reference voltage (such as 950 mV). The higher voltage causes dissociation of any water in the exhaust into oxygen and the sensor senses the excess oxygen. The controller may compare the pumping current output by the sensor at the lower voltage to the pumping current output by the sensor at the higher voltage, and learn a first sensor output as the difference between the pumping currents at the reference voltages before water injection.

At 310, the method includes injecting water according to the determined schedule, as previously described for method 200 in FIG. 2. This includes determining a first injection amount from a first location and a second injection amount from a second location based on a cooling demand relative to a dilution demand. Next, at 312, the method includes receiving a second output from the exhaust UEGO sensor operating in the VVs mode (UEGO_VV_2). The controller may compare the pumping current output by the sensor at the lower reference voltage to the pumping current output by the sensor at the higher reference voltage, and learn a second sensor output as the difference between the pumping currents at the reference voltages after the commanded water injection.

Following water injection, the controller receives the second output from the UEGO sensor and determines a sensed water injection amount based on the difference between the first and second output, as described below with regard to the method at 326.

However, if the engine is operating under DFSO conditions at 306, the method continues at 320 and includes receiving a first output from an exhaust UEGO sensor operating in nominal mode (UEGO_nom_1). During engine fueling conditions, when the engine is not in DFSO conditions, the exhaust UEGO may be operated in a nominal mode with a (fixed) reference voltage applied to the sensor, the reference voltage maintained during the sensing (e.g., the reference voltage may be 450 mV). Next, at 322, the method includes injecting water according to the determined schedule, as previously described for method 200 in FIG. 2. At 324, the method including receiving a second output from the exhaust UEGO sensor operating in nominal mode (UEGO_nom_2).

Both the method at 312 and the method at 324 continue to 326 where the method includes determining a change in oxygen level ($\Delta O2$) based on the difference between the first and second outputs. After commanding the water injection, the method includes determining the difference between the first and second outputs of the UEGO sensor operating in nominal or VVs mode. Then, the method continues to 328 and includes determining a water injection error based on the $\Delta O2$. By comparing the first sensor output measured before commanding a water injection to a second sensor output measured after the water injection, the controller may determine an amount of injected water that evaporated in the engine and contributed to charge dilution. The controller may thereby determine a sensed or actual amount of water that evaporated in the engine based on a difference between the first and second outputs, the sensed amount increased as the difference increases. At 330, the method includes calibrating the water injector based on the determined water injector error. In one example, calibrating the water injector includes adjusting an amount of water injected in subsequent water injection events based on a difference between a commanded injection amount and the determined water injection error. In another example, calibrating the water injector may include delivering a series of pulses and/or delivering pulses at an upper and lower limit of the water injector to determine a mean error and adjusting subsequent water injection amounts based on the determined mean error of the water injector. In this way, the UEGO sensor operating in either nominal or variable voltages mode may be used to determine the actual amount of water received in the engine and the water injection error so that the water injector may be calibrated, thereby improving the accuracy of a water injection system.

In FIG. 4, graph 400 illustrates example adjustments to water injection based on engine operating conditions. Graph 400 illustrates injecting water via one or more injectors of a water injection system (such as water injection system 60 shown in FIG. 1), to deliver an amount of water that provides charge cooling or charge dilution benefits. Further, the graph illustrates sensing a total amount of water injected based on an exhaust gas oxygen sensor output, and adjusting water injection, as well as engine operating parameters, such as spark timing and EGR flow, following a water injection. Specifically, graph 400 shows changes in engine speed at plot 402, a commanded amount of water injected via a port water injector (such as water injector 48 shown in FIG. 1) at plot 404, a commanded amount of water injected via a manifold water injector (such as water injector 45 shown in FIG. 1) at plot 406, changes in an output of an exhaust UEGO sensor (such as UEGO 126 shown in FIG. 1) at plot 410, changes in EGR flow at plot 412, and changes in spark timing at plot 414. Additionally, upper and lower limits for water injection at a selected injector are shown at plots 403, 404, 407, and 408. For each operating parameter, time is depicted along the horizontal axis and values of each respective operating parameter are depicted along the vertical axis.

Specifically, graph 400 shows a commanded amount of water injected via a selected water injector at 402-404, engine knock (e.g., knock output of one or more knock sensors) at plot 406, engine dilution demand at plot 408, changes in an output of a manifold charge temperature sensor at plot 410, changes in an output of an exhaust UEGO sensor at plot 412, and an estimated amount of injected water at plot 414 (as sensed based on the output of the MCT sensor). Water injection via a manifold water injector is shown via a dashed line at plot 402; a dotted line corresponds to water injection via port water injectors angled toward the intake manifold (plot 404), and a solid line corresponds to water injection via port water injectors angled into intake valves (plot 406). For each operating parameter, time is depicted along the horizontal axis and values of each respective operating parameter are depicted along the vertical axis.

Prior to time t1, the engine speed/load is below a threshold (plot 402) and water injection conditions are not confirmed due to water injection not being required. During this time, water injection is disabled.

At time t1, there is an increase in engine speed-load (plot 402) due to an increase in torque demand. Due to the move from low load to mid load conditions, an engine dilution demand increases. Additionally, due to an increase in load conditions, knock tendency may increase and an engine cooling demand increases. Due to water injection conditions being met, water is injected at the engine based on the dilution demand and the cooling demand. In response to a water injection request, the controller commands a first amount of water to inject from the port water injector (plot 404) and a second amount of water injected from the manifold water injector (plot 406) based on the dilution demand and the cooling demand of the engine, respectively. As a result of the water injection, spark timing (plot 414) advances between time t1 and t2. Additionally, output from the UEGO sensor (plot 410) increases.

Following water injection at time t1, the controller determines a water injection error based on a change in output from the UEGO sensor before and after water injection. The controller determines there is a water injection deficit based on the learned water injection error. Herein the error is within the limit of both the port and manifold water injector. As a result, between time t2 and t3, the controller adjusts both the first and second water injection amounts from the port and manifold water injectors, respectively, based on the determined water injection error. The controller increases the amount of water injected from both the port and manifold water injectors from a scheduled water injection amount (depicted as dashed lines) based on the determined deficit. Due to the increased water injection amount, spark timing (plot 414) advances and UEGO signal increases between time t2 and t3.

At time t3, the engine speed/load (plot 402) again increases due to an increase in torque demand. Due to the increase in engine speed/load to a relatively high engine speed/load, an engine cooling demand increases. In response to the increased cooling demand, the controller increases water injection from the port water injector at time t3. The UEGO sensor signal decreases (plot 410) at time t3 despite increased water injection. The controller determines there is a water injection deficit based on the change in UEGO sensor output lower than expected. As a result, the controller further increases the water injection amount (plot 404). However, between time t3 and t4, port water injection reaches an upper limit (plot 403). In response to port water injection being at the upper limit, the controller increases a commanded manifold water injection amount (plot 406) from a scheduled amount (dashed line) in order to compensate for the water injection error and achieve a desired cooling demand. Additionally, the controller retards spark timing from MBT (plot 414) to provide a remaining cooling demand after increasing the manifold water injection.

At time t4, the engine speed/load (plot 402) decreases due to a decrease in torque demand. Additionally, at time t4, due to the decrease in engine speed/load, the engine dilution demand increases relative to a cooling demand. Further, the upper (plot 407) and lower (plot 408) limits for manifold water injection change. In response to manifold water injection at the lower limit, the controller increases EGR flow to provide a remaining dilution demand after water injection with EGR.

Between time t5 and t6, the engine speed/load (plot 402) continues at a mid-load condition. Additionally, the controller determines there is a water injection deficit based on the water injection error learned based on the change in UEGO output (plot 410). However, manifold water injection reaches the upper limit (plot 407). As a result, the controller increases port water injection (plot 404) from the scheduled injection amount (dashed line) to compensate for the determined water injection error. Additionally, the controller may continue to retard spark from MBT (plot 414) between time t5 and t6 based on the determined water injection deficit to provide a remaining cooling demand. Further, due to increased dilution as a result of increased water injection, the controller decreases EGR flow (plot 412) between time t5 and t6.

At time t6, a dilution demand of the engine increases. In response to port (plot 404) and manifold (plot 406) water injection both at the upper limits, the controller increases EGR flow (plot 412) to provide a remaining desired dilution demand with EGR. Further, spark timing advances (plot 414) in response to water injection.

At time t7, the engine speed/load (plot 402) continues at a mid-load condition. Following water injection between time t6 and time 7, a desired cooling demand and a desired dilution demand is achieved. As a result, the controller decreases water injection from both the port and manifold water injectors based on the desired cooling demand and the desired dilution demand. Additionally, the controller decreases EGR flow based on a decreased remaining dilution demand after water injection. Further, the controller may retard spark to MBT (plot 414).

In this way, water injection may be used to provide engine cooling and engine dilution simultaneously by concurrently injecting water into distinct locations of the engine. Additionally, feedback from an exhaust oxygen sensor may be used to control water injection based on a total water injection amount. An initial water injection commanded to each injector and the total amount of water measured, as well as limits of each injector, may be used to adjust water injection at each injector. The technical effect of using feedback from the oxygen sensor to determine a total water injection error is that water injection errors may be compensated for by adjusting water injection amounts between distinct water injectors, based on their individual injector limits. By adjusting water injection from each water injector, water injection errors may be better compensated for. Additionally, by relying on an existing exhaust oxygen sensor for feedback control of water injection from multiple injectors, the need for dedicated sensors, including sensors for each distinct water injection, is reduced. Further, by injecting water at multiple engine locations and adjusting for errors, water injection may be used to provide knock relief and liquid EGR simultaneously, thereby reducing reliance on spark retard to address knock and combustion instability issues while water injection is used to provide engine dilution. By reducing reliance on spark retard to address knock tendency, fuel economy may be improved.

As one embodiment, a method includes injecting water into distinct engine locations responsive to each of an engine dilution demand and an engine cooling demand; and correcting a total water injection amount based on feedback from an exhaust oxygen sensor operating in a variable voltage mode. In a first example of the method, the method further comprises, operating the engine with an amount of exhaust gas recirculation (EGR) while injecting the water. A second example of the method optionally includes the first example and further includes wherein the amount of exhaust gas recirculation (EGR) provides EGR at a fixed EGR percentage rate of fresh airflow, even as engine load changes (from a mid-load to a minimum load). A third example of the method optionally includes one or more of the first and second examples, and further includes wherein injecting water into the distinct engine locations includes injecting water into one or more of an intake manifold, downstream of an intake throttle, an intake port, upstream of an intake valve, and an engine cylinder. A fourth example of the method optionally includes one or more of the first through third examples, and further includes wherein injecting water into distinct engine locations further includes injecting water into the engine in different directions, the different directions including a first direction towards the intake valve and a second direction away from the intake valve. A fifth example of the method optionally includes the first through fourth examples, and further comprises selecting a first water injector for injecting into a first location of the distinct engine locations and a second water injector for injecting into a second location of the distinct engine locations based on the engine dilution demand relative to the engine cooling demand, wherein the first location includes an intake port and the second location includes an intake port when the engine dilution demand is higher than the engine cooling demand, and wherein the first location includes an intake port and the second location includes an engine cylinder when the engine dilution demand is lower than the engine cooling demand. A sixth example of the method optionally includes the first through fifth examples, and further includes wherein the injecting includes injecting the total water injection amount as a first amount of water injected from a first water injector at a first location and a second amount of water injected from a second water injector at a second, different location, and wherein the correcting includes estimating an actual water injection amount based on the feedback, estimating an error between the total water injection amount and the actual water injection amount, and adjusting the first amount relative to the second amount based on the error.

A seventh example of the method optionally includes the first through sixth examples, and further includes wherein each of the first amount and the second amount are based on the engine dilution demand and the engine cooling demand, and further based on engine speed and engine load, and wherein the adjusting includes: adjusting only the first amount based on the error while maintaining the second amount when the error is within a first limit of the first injector; adjusting only the second amount based on the error while maintaining the first amount when the error is within a second limit of the second injector; and adjusting both the first amount and the second amount based on the error when the error is within the first limit of the first injector and the second limit of the second injector. An eighth example of the method optionally includes the first through seventh examples, and further includes wherein the first limit of the first injector and the second limit of the second injector are each based on one or more of an engine temperature, intake humidity, and the amount of EGR during the injecting. A ninth example of the method optionally includes the first through eighth examples, and further comprises, maintaining both the first amount and the second amount while adjusting one or more of the amount of EGR and spark timing based on the error when the error is outside the first limit of the first injector and outside the second limit of the second injector. A tenth example of the method optionally includes the first through ninth examples, and further includes wherein the exhaust oxygen sensor operating in the variable voltage mode includes a reference voltage of the oxygen sensor modulated between each of a first, lower voltage and a second, higher voltage, and wherein the correcting includes estimating a net water injection error based on a first output of the sensor operating in the variable voltage mode before injecting the water and a second output of the sensor operating in the variable voltage mode after injecting the water.

As another embodiment, a method comprises while operating an engine with an amount of exhaust gas recirculation (EGR), injecting a first amount of water into a first engine location and a second amount of water into a second engine location, the first and second amount feed-forward selected to meet each of an engine cooling demand and an engine dilution demand, the first and second amount feedback adjusted based on a net water injection error estimated via an exhaust oxygen sensor operating in a variable voltage mode. In a first example of the method, the method further comprises, determining a first error threshold for the first injector and a second error threshold for the second injector based on engine temperature, intake humidity, the first engine location relative to the second engine location, and the amount of EGR, and wherein the feedback adjusting includes adjusting the first amount and the second amount based on the net water injection error relative to each of the first error threshold and the second error threshold. A second example of the method optionally includes the first example and further includes wherein the feedback adjusting includes: adjusting the first and second amount equally based on the net water injection error until one of the first error threshold and the second error threshold is reached, and thereafter adjusting only the first amount after the second error threshold is reached and adjusting only the second amount after the first error threshold is reached. A third example of the method optionally includes one or more of the first and second examples, and further includes further comprising, adjusting the amount of EGR based on the feedback adjusting of the first amount and the second amount. A fourth example of the method optionally includes the first through third examples, and further includes wherein estimating the net water injection error via the exhaust oxygen sensor includes: modulating a reference voltage of the sensor between a first lower voltage and a second higher voltage before and after the injecting; determining a first difference between a pumping current of the sensor at the first voltage and at the second voltage responsive to the modulating before the injecting; determining a second difference between the pumping current of the sensor at the first voltage and at the second voltage responsive to the modulating after the injecting; and determining the net water injection error based on the first difference relative to the second difference. A fifth example of the method optionally includes the first through fourth examples, and further includes wherein the first injector is a port water injector and the first location includes an intake valve surface when an intake valve is closed, and an port surface when the intake valve is open, and wherein the second injector is a manifold water injector and the second location includes an intake manifold, downstream of an intake throttle.

As yet another embodiment, a system includes an engine; a first water injector for injecting water into an intake port; a second water injector for injecting water into an intake manifold; an oxygen sensor coupled to an exhaust manifold; an EGR passage including an EGR valve for recirculating exhaust from the exhaust manifold to the intake manifold; and a controller with computer readable instructions for: estimating each of an engine dilution demand and an engine cooling demand based on engine speed and load; determining a total water injection amount that meets each of the engine dilution demand and the engine cooling demand; commanding the total water injection amount as an initial ratio of a first water injection amount from the first water injector and a second water injection amount from the first water injector, the initial ratio based on the total water injection amount and injection limits of each of the first and second water injector; estimating an actual amount of water injected into the engine based on feedback from the oxygen sensor operating in a variable voltage mode; and updating the initial ratio based on an error between the commanded total water injection amount and the estimated actual amount of water. In a first example of the system, the system further includes wherein the updating includes: updating the first amount based on the error relative to the injection limit of the first injector; updating the second amount based on the error relative to the injection limit of the second injector; updating a position of the EGR valve based on an engine dilution deficit after the updating; and retarding spark timing based on an engine cooling deficit after the updating. A second example of the system optionally includes the first example and further includes wherein the updating further includes: updating the first amount and the second amount at an equal rate when the error is within the injection limit of each of the first injector and the second injector; and updating the first amount and the second amount at an unequal rate when the error is within the injection limit of one of the first injector and the second injector.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system, where the described actions are carried out by executing the instructions in a system including the various engine hardware components in combination with the electronic controller.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method, comprising:
   injecting water into distinct engine locations responsive to each of an engine dilution demand and an engine cooling demand; and
   correcting a total water injection amount based on feedback from an exhaust oxygen sensor operating in a variable voltage mode.

2. The method of claim 1, further comprising operating an engine with an amount of exhaust gas recirculation (EGR) while injecting the water.

3. The method of claim 2, wherein the amount of EGR provides EGR at a fixed EGR percentage rate of fresh airflow, even as engine load changes (from a mid-load to a minimum load).

4. The method of claim 1, wherein injecting water into the distinct engine locations includes injecting water into one or more of an intake manifold, downstream of an intake throttle, an intake port, upstream of an intake valve, and an engine cylinder.

5. The method of claim 4, wherein injecting water into the distinct engine locations further includes injecting water into an engine in different directions, the different directions including a first direction towards the intake valve and a second direction away from the intake valve.

6. The method of claim 5, further comprising selecting a first water injector for injecting into a first location of the distinct engine locations and a second water injector for injecting into a second location of the distinct engine locations based on the engine dilution demand relative to the engine cooling demand, wherein the first location includes the intake port and the second location includes the intake port when the engine dilution demand is higher than the engine cooling demand, and wherein the first location includes the intake port and the second location includes the engine cylinder when the engine dilution demand is lower than the engine cooling demand.

7. The method of claim 2, wherein the injecting includes injecting the total water injection amount as a first amount of water injected from a first water injector at a first location and a second amount of water injected from a second water injector at a second, different location, and wherein the correcting includes estimating an actual water injection amount based on the feedback, estimating an error between the total water injection amount and the actual water injection amount, and adjusting the first amount relative to the second amount based on the error.

8. The method of claim 6, wherein each of the first amount and the second amount are based on the engine dilution demand and the engine cooling demand, and further based on engine speed and engine load, and wherein the adjusting includes:
adjusting only the first amount based on the error while maintaining the second amount when the error is within a first limit of the first injector;
adjusting only the second amount based on the error while maintaining the first amount when the error is within a second limit of the second injector; and
adjusting both the first amount and the second amount based on the error when the error is within the first limit of the first injector and the second limit of the second injector.

9. The method of claim 8, wherein the first limit of the first injector and the second limit of the second injector are each based on one or more of an engine temperature, intake humidity, and an amount of EGR during the injecting.

10. The method of claim 8, further comprising maintaining both the first amount and the second amount while adjusting one or more of an amount of EGR and spark timing based on the error when the error is outside the first limit of the first injector and outside the second limit of the second injector.

11. The method of claim 1, wherein the exhaust oxygen sensor operating in the variable voltage mode includes a reference voltage of the exhaust oxygen sensor modulated between each of a first, lower voltage and a second, higher voltage, and wherein the correcting includes estimating a net water injection error based on a first output of the exhaust oxygen sensor operating in the variable voltage mode before injecting the water and a second output of the exhaust oxygen sensor operating in the variable voltage mode after injecting the water.

12. A method, comprising:
while operating an engine with an amount of exhaust gas recirculation (EGR),
injecting a first amount of water into a first engine location and a second amount of water into a second engine location, the first and second amounts feed-forward selected to meet each of an engine cooling demand and an engine dilution demand, the first and second amounts feedback adjusted based on a net water injection error estimated via an exhaust oxygen sensor operating in a variable voltage mode.

13. The method of claim 12, further comprising determining a first error threshold for a first injector and a second error threshold for a second injector based on engine temperature, intake humidity, a first engine location relative to a second engine location, and the amount of EGR, and wherein the feedback adjusting includes adjusting the first amount and the second amount based on the net water injection error relative to each of the first error threshold and the second error threshold.

14. The method of claim 13, wherein the feedback adjusting includes:
adjusting the first and second amounts equally based on the net water injection error until one of the first error threshold and the second error threshold is reached, and thereafter adjusting only the first amount after the second error threshold is reached and adjusting only the second amount after the first error threshold is reached.

15. The method of claim 14, further comprising adjusting the amount of EGR based on the feedback adjusting of the first amount and the second amount.

16. The method of claim 12, wherein estimating the net water injection error via the exhaust oxygen sensor includes:
modulating a reference voltage of the sensor between a first lower voltage and a second higher voltage before and after the injecting;
determining a first difference between a pumping current of the sensor at the first voltage and at the second voltage responsive to the modulating before the injecting;
determining a second difference between the pumping current of the sensor at the first voltage and at the second voltage responsive to the modulating after the injecting; and
determining the net water injection error based on the first difference relative to the second difference.

17. The method of claim 12, wherein a first injector is a port water injector and the first engine location includes an intake valve surface when an intake valve is closed, and a port surface when the intake valve is open, and wherein a second injector is a manifold water injector and the second engine location includes an intake manifold, downstream of an intake throttle.

18. An engine system, comprising:
an engine;
a first water injector for injecting water into an intake port;
a second water injector for injecting water into an intake manifold;
an oxygen sensor coupled to an exhaust manifold;
an EGR passage including an EGR valve for recirculating exhaust from the exhaust manifold to the intake manifold; and
a controller with computer readable instructions for:
estimating each of an engine dilution demand and an engine cooling demand based on engine speed and load;
determining a total water injection amount that meets each of the engine dilution demand and the engine cooling demand;
commanding the total water injection amount as an initial ratio of a first water injection amount from the first water injector and a second water injection amount from the first water injector, the initial ratio based on the total water injection amount and injection limits of each of the first and second water injectors;

estimating an actual amount of water injected into the engine based on feedback from the oxygen sensor operating in a variable voltage mode; and updating the initial ratio based on an error between the commanded total water injection amount and the estimated actual amount of water.

19. The system of claim 18, wherein the updating includes:

updating the first amount based on the error relative to the injection limit of the first injector;

updating the second amount based on the error relative to the injection limit of the second injector;

updating a position of the EGR valve based on an engine dilution deficit after the updating; and retarding spark timing based on an engine cooling deficit after the updating.

20. The system of claim 18, wherein the updating further includes:

updating the first amount and the second amount at an equal rate when the error is within the injection limit of each of the first injector and the second injector; and updating the first amount and the second amount at an unequal rate when the error is within the injection limit of one of the first injector and the second injector.

* * * * *